March 12, 1963 J. R. RUHLMAN 3,080,631
APPLIANCE FOR LINEAR BODIES
Filed Aug. 12, 1959
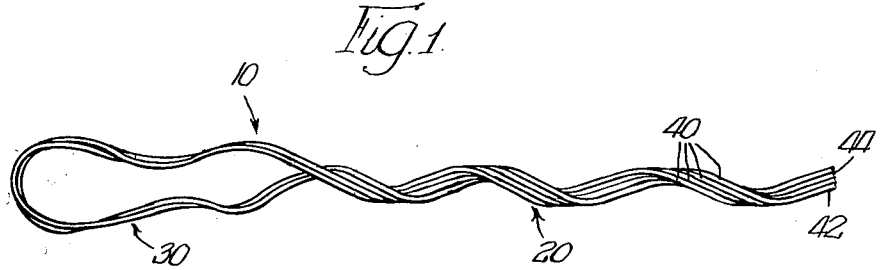
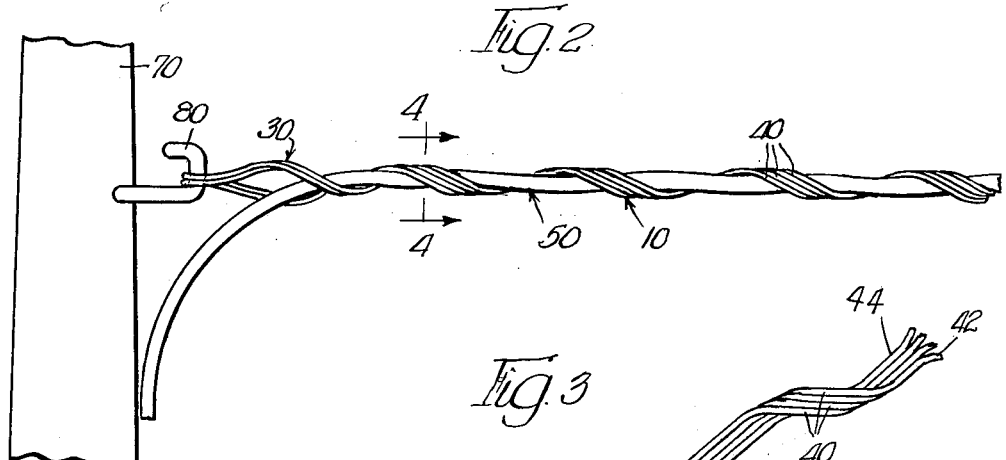
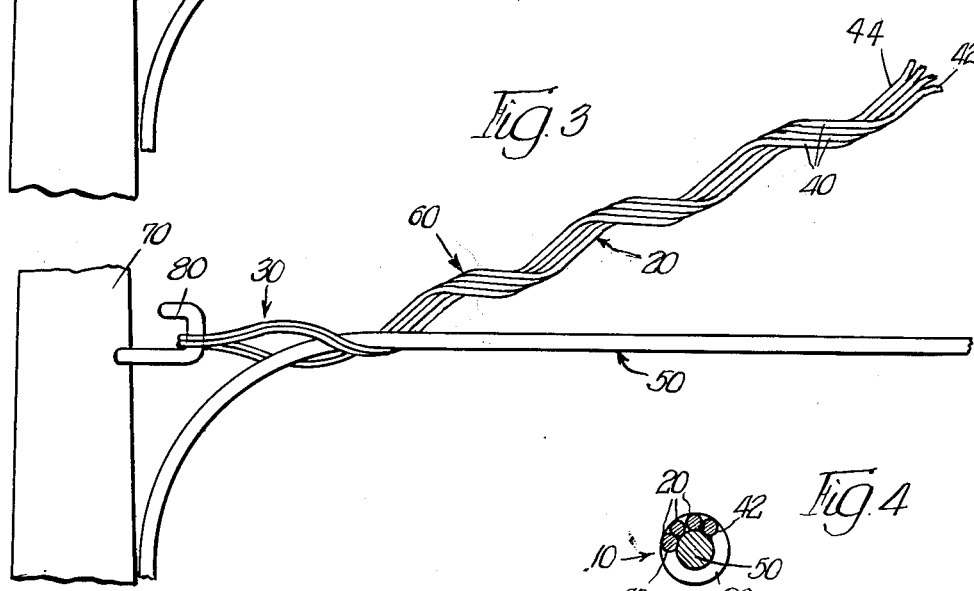
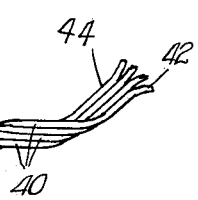
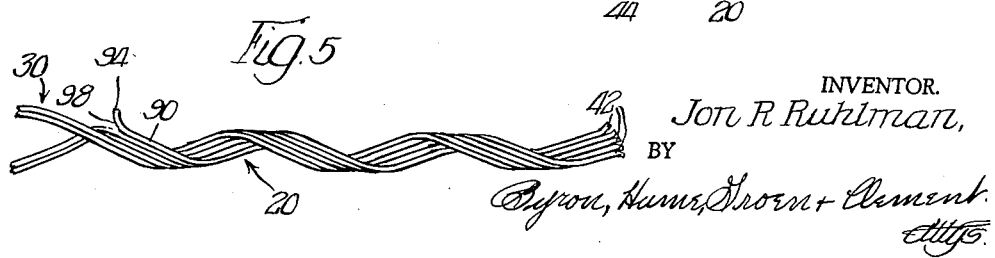
INVENTOR.
Jon R Ruhlman,
BY
Byron, Hume, Brown + Clement
ATTYS.

United States Patent Office 3,080,631
Patented Mar. 12, 1963

3,080,631
APPLIANCE FOR LINEAR BODIES
Jon R. Ruhlman, Cleveland, Ohio, assignor to Preformed Line Products Company, Inc., Cleveland, Ohio, a corporation of Ohio
Filed Aug. 12, 1959, Ser. No. 833,272
3 Claims. (Cl. 24—131)

This invention pertains to appliances for use with linear bodies such as electrical transmission lines, cables, and the like. Specifically, the invention relates to the utilization of helically preformed elements for dead ends, suspension means, and the like, and to a certain degree relates to helically preformed elements similar to those shown and discussed in the patent to Peterson 2,761,273 issued on September 4, 1956, entitled "Dead Ends for Linear Bodies."

There are shown in the Peterson patent several types of dead ends for cables constructed of helically preformed elements. The dead ends shown in this patent may be generally characterized as having a body gripping portion consisting of a plurality of helically preformed elements in which each helical member is in a substantially diametrically opposing relationship to a like member and in which the internal diameter of the helix is smaller than the diameter of the cable to which it is applied. As a result of this arrangement these dead ends depend upon circumferentially uniform radial pressure from the helical elements comprising the dead end for securing the same to the linear body. The dead ends disclosed in the Peterson patent represent a significant advance over the prior art devices, and as a result enjoy an extraordinary measure of commercial success.

Such dead ends have, as the result of the radial pressure component, a nonlinear slip load characteristic in which there is a parabolic relationship between the slip load and the contact length of the body gripping portion. This parabolic relationship causes large variations in the slip load with small variations in contact length. Consequently, it has been difficult heretofore to provide a dead end with a predetermined slip load characteristic.

In some installations it is desirable to have a dead end that has a readily determinable and substantially linear slip load characteristic. Accordingly this invention has a foremost feature and object of readily permitting a predetermined slip load. This feature is the result of a snubbing action by the body gripping portion of the dead end rather than the aforementioned radial pressure component.

The invention may be briefly characterized as a dead end composed of a body gripping portion and a bight portion. The body gripping portion is formed by a plurality of helically preformed elements mutually conforming as to hand of lay, internal helical diameter and pitch length. The latter two dimensions are of such magnitude as to permit the wrapping of the helices in the body gripping portion around a linear body from the side thereof into a tightly gripping encircling relation therewith. The pitch length is of such magnitude that the first and last helices in any right section when the helices are arranged in a continuous relationship are spaced from each other. Thus the body gripping portion may in a sense be characterized as a helical band of open pitch. The helices of which the body gripping portion is composed are divided at one end to form the aforementioned bight portion.

It has further been discovered that many times the bight portion, when constructed in the manner shown in the patent to Selquist 2,202,538 and the patent to Byl 1,725,610, will fail due to fatigue induced by the varying loads applied to the linear body, as will be described more fully hereinafter. Accordingly a second feature of the invention resides in the provision of a dead end in which the tendency for fatigue failure is minimized. This feature is the result of a bight portion which is provided with a helical construction so as to afford some resiliency when the linear body to which the dead end is secured is subjected to loads other than normal. The characteristics of the helical members in the bight portion in regard to hand of lay, internal helical diameter, and pitch length may vary somewhat from those of the body gripping portion.

A still further object of the invention is to provide a dead end of a simple construction and economical cost that permits a determinable slip load characteristic.

A still further object of the invention is to provide a dead end that may be readily applied to a linear body without any extraordinary skills or special apparatus.

These and other objects of the invention will be apparent upon reading of the specification with reference to the following drawings:

In the drawings:

FIGURE 1 is a side view of the dead end embodying the invention.

FIGURE 2 shows the dead end shown in FIGURE 1 as applied to a linear body.

FIGURE 3 is an illustration of one manner for applying the dead end to a linear body.

FIGURE 4 is a sectional view taken along the lines 4—4 in FIGURE 2.

FIGURE 5 is a side view in elevation of a modified form of the invention.

It should be noted, while the appliance embodying the invention will for convenience be called a dead end, that this is not to be construed as a limitation. One use other than as a dead end is for suspending transmission lines or as a drop wire hanger. Other uses will be apparent upon reading of the specification.

Hereinafter the elements used in the construction of the dead end embodying the invention will be referred to as helices or as helical elements. In one preferred form the helices appear as round rod or wire stock which has been helically preformed for the purpose of embracing suspended linear bodies as will be described more fully hereinafter. The helices may, however, be composed of substances other than metal, such as plastics and the like, and may take other cross-sectional configurations than round, although round metal sections are the preferred form.

Referring now to FIGURE 1, there is shown a preferred form of the dead end embodying the invention, generally denoted by the numeral 10. The dead end 10 includes a body gripping portion and a bight portion generally denoted by the numerals 20 and 30, respectively. The body gripping portion 20 is constructed of a plurality of helices 40 arranged in a contiguous or bridging relationship as shown in the drawings. In this particular instance, the body gripping portion 20 is constructed of four helices 40 which are shown as rods that have been helically preformed in a predetermined manner. It should be understood that the use of four helices in the body gripping portion is merely by way of example and that any number less than a full complement may be used.

The helices 40 as shown in FIGURES 1 and 2 are mutually conforming as to hand of lay, internal helical diameter, and pitch length. The pitch length of the helices is such that the first helical element 42 is spaced from the last helical element 44 in any right section as shown in FIGURE 4. Alternatively, it may be said that the body gripping portion is composed of less than a full complement of the helices 40. As a result of this arrangement, the helices 40 co-operate to form what could be considered in some respects as a helical band of an open pitch that may be readily applied to a linear body, as will be described more fully hereinafter.

In its preferred form the internal diameter of the helix is substantially less than the total diameter of the linear body to be suspended. At the same time, however, the internal diameter of the helix should be such that the body gripping portion 20 may be readily applied to the linear body. As a result, the body gripping portion will tightly embrace the linear body to which it is applied.

I have discovered that the linear body 50 will be forced to assume a sinuous form as shown in FIGURE 2 when its diameter is less than the internal diameter of the helix. This sinuous form is the result of the radial pressure applied by the helical elements 40 composing the body gripping portion 20. The radial pressure in any right section, as can be seen in FIGURE 4, from the helical elements 40 will be substantially unopposed in one direction. This is the result of the fact that the helical elements are arranged so that they are concentrated about an arcuate segment substantially less than the entire circumference of the right section. This unbalanced radial pressure causes the linear body to be deformed in a direction away from the helical elements, with the amount of deformation being a function of the internal diameter of the helix. The helical elements, however, may be displaced somewhat from their reposed position by the resistance of the linear body 50 to such displacement. In any event, there will generally be some displacement of the linear body 50. The sinuous shape will be in the form of a helix conforming in pitch length to the band formed by the helical elements 40.

It can now be seen, if there is a load tending to displace the linear body 50 in a longitudinal direction after it has once assumed a sinuous shape in conformity with the body gripping portion, that there would be resistance to any such movement. This resistance would be due to the fact that each increment of the linear body 50 would be forced to assume a new position in conformity with its new relationship with the body gripping portion.

The resistance generated by the various increments will generally be cumulative so that the total resistance would be a function of the length of contact between the body gripping portion and the linear body. The amount of resistance would also be a function of the amount of displacement required by such movement. If, for example, the internal diameter is relatively small as compared to the diameter of the linear body 50, then the amount of displacement for each increment of longitudinal change would be relatively great. Consequently, the resistance to movement generated by a relatively small internal helical diameter for a given increment would be relatively great as compared to a body gripping portion having an internal diameter substantially equal to the diameter of the linear body.

Due to the fact that the resistance to longitudinal movement between the body gripping portion and the linear body 50 is cumulative for each increment of contact length, it can be seen that for a given ratio of internal diameter to diameter of linear body 50, it will be possible to closely approximate the slip load for a given contact length. As a result of this arrangement, it is possible to provide a dead end that will permit slippage between the body gripping portion and the linear body 50 at some predetermined load.

It should be noted that there may be a secondary component of resistance to any longitudinal movement between the body gripping portion 20 and the linear body 50. The secondary resistance will be the result of the frictional relationship between the helical elements 40 and the linear body 50. The frictional relationship, in turn, will be dependent upon the coefficient of friction between the helical elements and the linear body. It will also be dependent upon the amount of radial force asserted by the helical elements upon the linear body which in turn will be at least partially dependent upon the resistance to displacement by the linear body. It is believed, however, that this type of resistance will generally be considerably lower in magnitude than the resistance due to deformation previously discussed.

As best shown in FIGURE 1, the bight portion 30 consists of the helical elements 40 being divided into two parts and expanded so as to form the eye of the bight. In this particular instance any right section of the bight consists of two helical elements or one-half the number of helical elements used in the construction of the body gripping portion 20.

As shown in the drawings, the helical construction continues from the body gripping portion 20 into the bight portion 30. It has been discovered that the helical construction in the bight portion 30 reduces the possibility of fatigue failure as the result of the varying loads imposed upon the dead end by the linear body. These varying loads are the result of wind, ice, temperature changes, and the like. As the load is increased, the helical configuration will tend to straighten out, thus providing some give or resilience. When the extra load is removed, the helices due to their natural resiliency will then tend to assume the repose condition or normal condition. The resilience of the helical construction has been found to minimize the effect of the varying loads, so as to considerably reduce the possibility of fatigue failure of the bight portion.

In the preferred form the bight portion 30 includes several pitch lengths of the helical construction. It may be desirable in certain instances to increase the pitch angle or alternatively decrease the pitch length in the bight portion 30 so that the length of wire necessary for the several pitch lengths is reduced. Another particular advantage of increasing the pitch angle is to reduce the possibility of the unraveling or unwinding of the helical elements 40.

In FIGURE 2 the linear body 50 is shown as being suspended from a vertical support 70 having a hook member 80 depending therefrom. The hook member 80 receives the bight portion 30 of the dead end 10 as shown in the drawing. The hook is an illustration of one manner in which the dead end may be utilized for suspending a line and is not to be construed as a limitation.

Referring now to FIGURE 3, there is shown one method for applying the dead end 10 to a linear body 50. The dead end will generally have been manufactured by some suitable apparatus and will be ready for installation at a desired location. One method of manufacture consists of taking less than a half-lay of helically preformed elements and return-bending them so that they are in the mutual phase relationship. It should be kept in mind that certain special techniques may be necessary to carry out the bending operation. This is the result of the fact that if it is merely attempted to bend the helical elements over a pin or some similar member, the relationship between the pin and the helical elements will cause the same to assume such a position with respect to the pin that the two return-bent portions will be in an opposite phase relationship. Consequently it is necessary to bend the helical elements in such a manner that they assume the contiguous relationship shown in the drawings.

It may be desirable to bend the elements 40 adjacent their ends so that the end portions 42 diverge from the linear body 50, as shown in FIGURE 3. In this manner it is possible to prevent chafing of the conductor by the ends of the elements 40.

One method for applying the dead end consists of first placing the body gripping portion 20 at the point of convergence between the two bight sections into a contiguous or tangential relationship with the linear body 50. When the dead end 10 is in this position, the linear body 50 will be in association with the eye of the bight portion 30, as shown in FIGURES 2 and 3. The body gripping portion 20 will then be displaced at some angular disposition to the linear body. It is then possible to rotate the body gripping portion 20 in the direction of the helix so that it is wrapped about the linear body. In this particular instance the body gripping portion when rotated in the direction of the arrow shown in FIGURE 3 will be brought into embracing relationship with the linear body.

From this illustration it can be seen that by separating the body gripping portion elements into the return bent groups the dead end 10 can readily be applied to some previously existing installation without removal of the linear body or wire and threading it through the eye of the bight portion. This is particularly important since in many instances appliances such as dead ends and the like are applied after the installation has been made. If it were necessary to restring the wire, it can be seen that it would be extremely costly as well as require a considerable amount of time and effort.

It may be desirable in certain instances to secure the helical members 40 in their contiguous relationship by some suitable adhesive. One material that is found particularly suitable for this construction is Neoprene, although other similar plastic and rubber materials may be used. It may also be desirable in certain instances to provide some gripping material that will increase the co-efficient between the helices 40 and the linear body. One material that has proven to be particularly satisfactory for this use is aluminum oxide grit which may be secured to the inside of the helices by the aforementioned adhesive material. In this manner it is possible to increase the gripping power of the body gripping portion so as to minimize the amount of slippage.

In FIGURE 5 there is shown a modification especially adapted for application to a suspended line where it is not feasible to separate the body gripping portions into the return bent groups. In this instance the body gripping portion 20 includes an extra linear element 90 which extends for at least a portion of the length of the former. The element 90 ends adjacent the throat of the bight 30 and in its preferred form has a bend 92 adjacent its end with the portion 94 extending outwardly from the body gripping portion 20. The portion 94 by extending outwardly from the body gripping portion 20 prevents a linear body from inadvertently unwinding around the former notwithstanding the fact that it does not extend through the bight 30.

It should be kept in mind that while the dead end as shown in FIGURES 1, 2 and 3 is constructed of a bight portion that is a longitudinal extension of the body gripping portion, there may be some other angular relationships between the two portions. As a matter of fact, it may be desirable in certain instances for the bight portion 30 to be at a right angle disposition to the body gripping portion. In any event the angular disposition of the two portions may be varied in order to suit the specific need.

From the foregoing description it can be seen that the subject invention provides a dead end of a relatively simple and economical construction. The dead end may be applied to linear bodies and the like as they are being installed or after the installation has been made. Furthermore, it can be seen that one of the important features of the dead end is that it will permit slippage of the linear body at some readily predeterminable load.

Although specific embodiments of the invention have been shown, it is to be understood that this is merely by way of example and in no manner to be construed as a limitation. It is contemplated that certain modifications may be made within the scope of the claims without departing from the spirit of the invention.

What is claimed is:

1. An appliance for use in suspending linear bodies such as cables, electrical conductors and the like, comprising at least one helically formed element formed of substantially rigid material having an internal diameter and pitch length sufficient to admit wrapping said element around the linear body of association from the side thereof into tightly encircling relationship therewith, said helically formed element including a return-bend intermediate its ends, and return-bent legs, said return bent legs being intertwisted into coaxial contiguous relationship whereby the return-bend constitutes a bight portion for engaging with external supporting means and said intertwisted legs constitute a body gripping portion, said return-bent legs when intertwisted constituting at most a half lay and when applied to a linear body are concentrated in any right section about an arcuate segment comprising at most one-half of the periphery of said linear body in said right section.

2. The invention as defined in claim 1 further characterized as including a plurality of helically formed elements.

3. The invention as defined in claim 2 further characterized as including an additional helical element which extends for a portion of the length of said body gripping portion, said additional helical element having means for preventing unraveling of said linear body from said body gripping portion.

References Cited in the file of this patent

UNITED STATES PATENTS

| | | |
|---|---|---|
| 2,587,521 | Peterson | Feb. 26, 1952 |
| 2,729,054 | Peterson | Jan. 3, 1956 |
| 2,761,273 | Peterson | Sept. 4, 1956 |
| 2,888,726 | Smith | June 2, 1959 |
| 2,943,135 | Bertling | June 28, 1960 |
| 2,947,504 | Ruhlman | Aug. 2, 1960 |

FOREIGN PATENTS

| | | |
|---|---|---|
| 411,940 | Great Britain | June 21, 1934 |